United States Patent [19]

Levine

[11] Patent Number: 4,593,311

[45] Date of Patent: Jun. 3, 1986

[54] ELECTRICAL REGISTRATION OF CCD IMAGERS

[75] Inventor: Peter A. Levine, Mercer County, N.J.

[73] Assignee: RCA Corporation, Princeton, N.J.

[21] Appl. No.: 556,582

[22] Filed: Nov. 30, 1983

[51] Int. Cl.[4] .................. H04N 9/093; H04N 9/09; H04N 3/14
[52] U.S. Cl. ...................................... 358/51; 358/43; 358/213
[58] Field of Search .................. 358/41, 43, 44, 50, 358/51, 52, 213

[56] References Cited

U.S. PATENT DOCUMENTS

| | | | |
|---|---|---|---|
| 3,705,328 | 12/1972 | Torok | 358/180 |
| 4,249,203 | 2/1981 | Yamanaka | 358/50 |
| 4,323,918 | 4/1982 | Bendell | 358/50 |
| 4,426,664 | 1/1984 | Nagumo et al. | 358/213 |
| 4,439,788 | 3/1984 | Frame | 358/213 |
| 4,521,804 | 6/1985 | Bendell | 358/51 |

FOREIGN PATENT DOCUMENTS

| | | | |
|---|---|---|---|
| 85678 | 5/1983 | Japan | 358/51 |
| 84/02989 | 8/1984 | PCT Int'l Appl. | |
| 84/02990 | 8/1984 | PCT Int'l Appl. | |
| 1340088 | 12/1973 | United Kingdom | |
| 2098827 | 11/1982 | United Kingdom | |
| 2127649 | 4/1984 | United Kingdom | |
| 2135851 | 9/1984 | United Kingdom | |

Primary Examiner—James J. Groody
Assistant Examiner—Randall S. Svihla
Attorney, Agent, or Firm—Eugene M. Whitacre; Jerald E. Roehling; Lawrence C. Edelman

[57] ABSTRACT

Electrical registration is provided in the vertical and horizontal directions of a multiple-imager solid-state camera. The solid-state imagers in a solid-state camera are provided having an active or utilized area of the imagers which is smaller than the photosensitive area of the imager. By controlling the clocking of the imager the processed signal from the imagers can be aligned electrically so that each imager is effectively spatially aligned with the others, thereby decreasing the required mechanical alignment tolerance.

7 Claims, 18 Drawing Figures

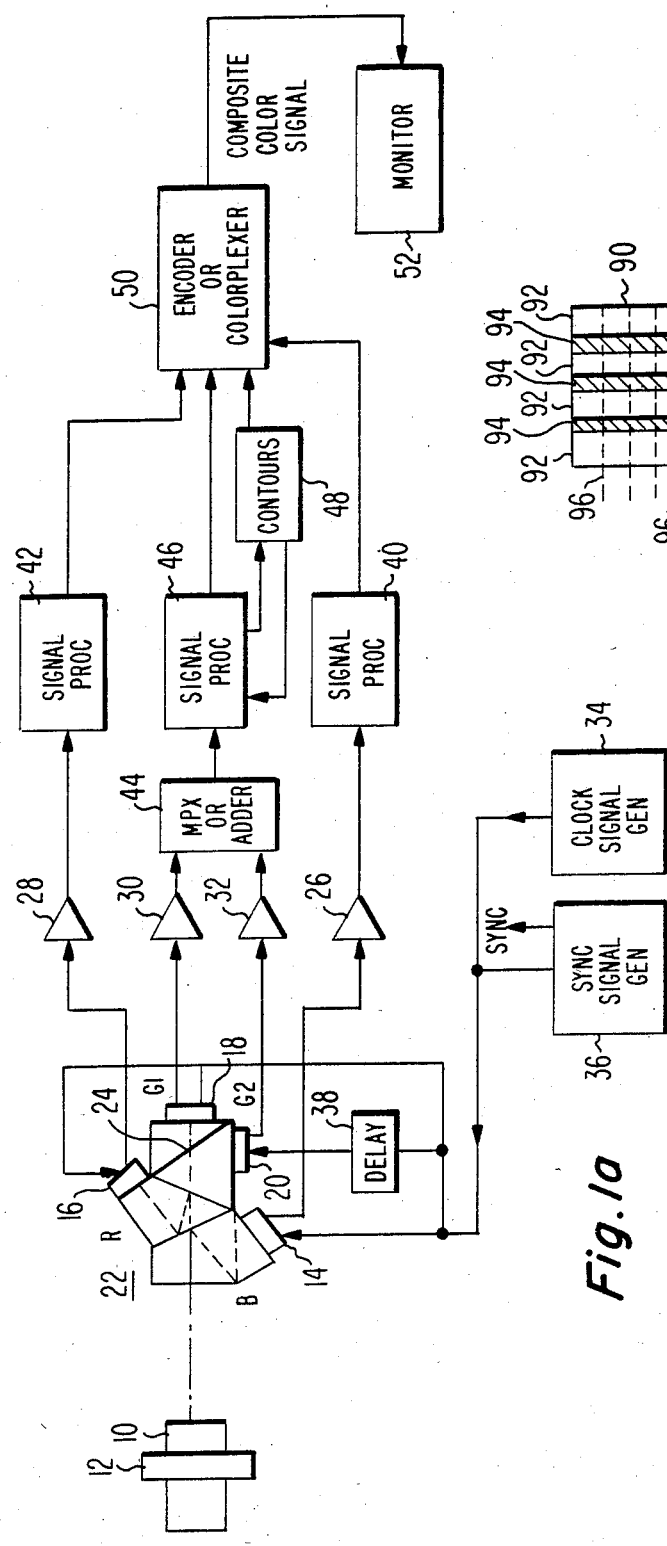
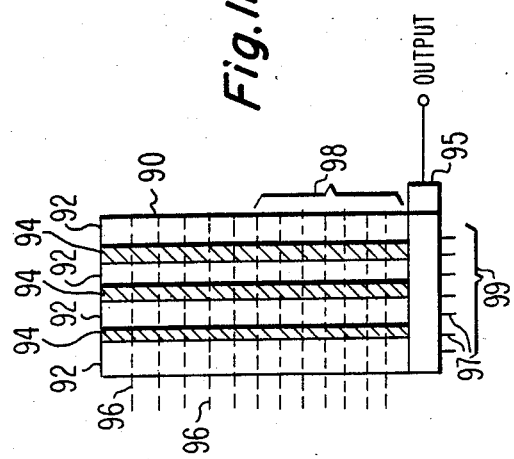
Fig.1a
Fig.1b

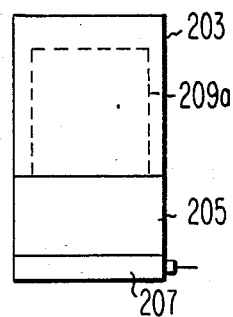 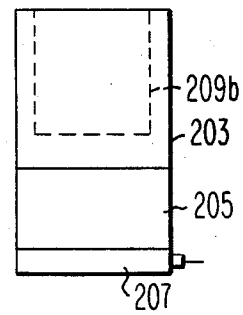 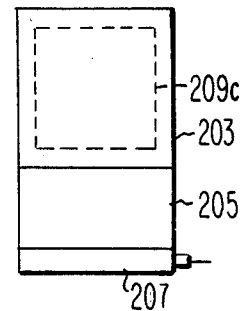
Fig.6a    Fig.6b    Fig.6c
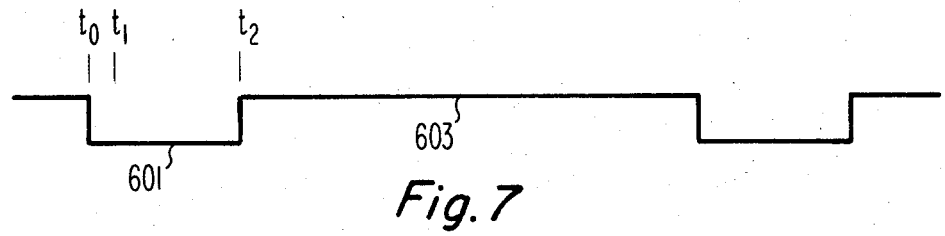
Fig.7
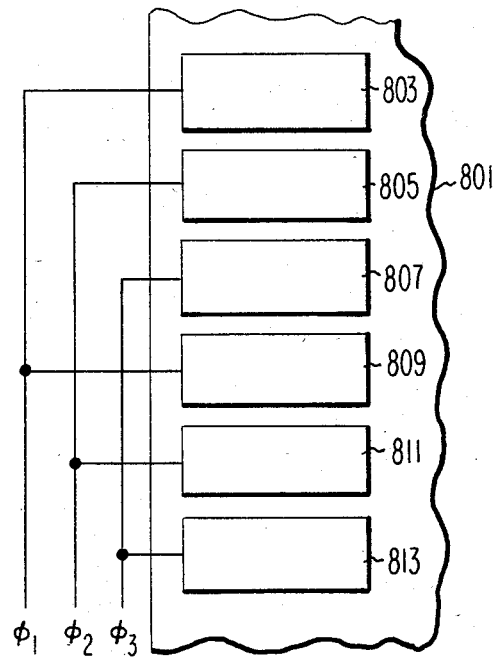
Fig.8

ELECTRICAL REGISTRATION OF CCD IMAGERS

The present invention relates to solid-state television cameras having clocking signals adjusted for adjusting the position of a phantom raster with respect to the photosensitive surface of the imager and, more particularly, to color cameras for electrical registration of one imager with respect to another imager.

BACKGROUND OF THE INVENTION

In the manufacture of multiple charge-coupled device (CCD) imager color cameras for broadcast or other applications it is necessary to accurately align one imager with respect to other imagers in cameras. This problem is different for solid-state cameras than for tube-type cameras because they do not use magnetic or electrostatic deflection to determine the position of the scan with respect to the projected image. Imaging tubes can be electrically aligned by adjustment of the scanning currents and voltages as well as by positioning of the yoke in the case of magnetic deflection. The ultimate fine positioning is electronic, thereby eliminating the need for fine mechanical manipulation thus resulting in lower camera cost.

The present approach for alignment of CCD imagers, illustratively described in U.S. Pat. No. 4,323,918 issued on Apr. 6, 1982, in the name of S. L. Bendell, involves highly accurate mechanical alignment within a fraction of a pixel. For example, in some devices the vertical pixel dimension is 20 micrometers and the horizontal is 16 micrometers requiring alignment to within a few micrometers. The basic idea is to align all pixels in each chip exactly with the corresponding pixels in the other chips, therefore, corresponding parts of the image fall on exactly the same spatial pixel position for each imager.

In accordance with the principles of the present invention an alternative means for aligning the individual CCD imagers is provided. It is based on the idea that a one-to-one spatial alignment of pixels is not necessary. An electrical registration is provided to effect an instantaneous alignment of the video outputs of a plurality of imagers so that the video outputs correspond to the same point within a scene.

In accordance with one aspect of the present invention the pixel boundaries from imager-to-imager are not necessarily aligned in an exact spatial correspondence. It has been discovered that this electrical registration may be effected without an exact spatial correspondence between imagers. This can be understood by considering an oversampled scene. This scene will be exactly reproduced by the imager and once low pass filtered will not exhibit any aliasing. Therefore, the reproduced image will be the same for any pixel position but merely shifted in time. Scenes which are undersampled will show aliasing and will therefore be sensitive to pixel centers. However, for most real world imaging, alias scene energy is very low in comparison to valid scene information.

SUMMARY OF THE INVENTION

A camera having a solid-state imager provides television signals representative of a scene. In the camera the scene is imaged onto a photosensitive surface of the imager. A clock means is provided for generating a clocking signal. Further, alignment means, responsive to the clock means, is provided for inserting the signal produced from a predetermined portion of the photosensitive surface into the active portion of a television signal to produce a television signal representative of the scene imaged onto said predetermined portion.

BRIEF DESCRIPTION OF THE DRAWING

In the drawing:

FIGS. 1a and 1b illustrate, partially in block diagram form, a camera including a prism, and optical system with a four-port color-splitting prism and four discrete-sensor solid-state imagers;

FIGS. 6a–6c illustrate raster patterns aiding in understanding how the virtual imager may be positioned vertically within the physical imager;

FIG. 7 is a timing diagram showing the vertical blanking pulse interval to aid in understanding the details of the invention; and FIG. 8 shows a portion of a solid-state imager to aid in understanding one aspect of the present invention.

DETAILED DESCRIPTION OF THE PREFERRED EMBODIMENTS

Figure 2:
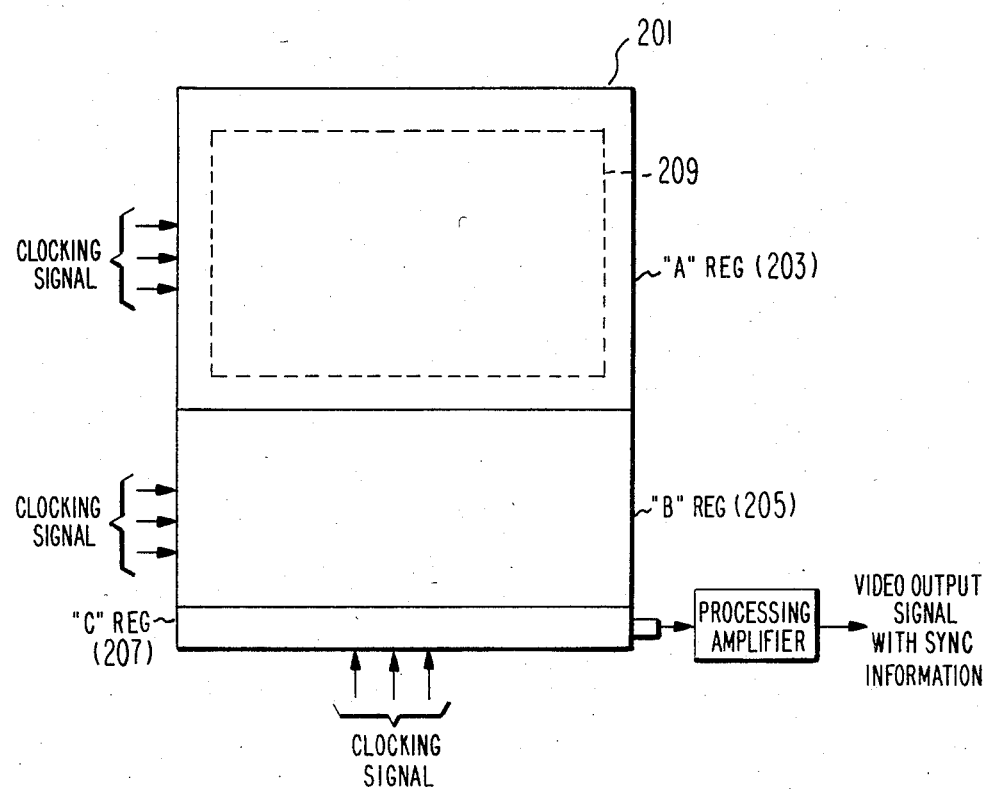
FIG. 2 is a block schematic of a CCD imager in accordance with the principles of the present invention.

A system will be described by which electrical registration is accomplished in both the vertical and horizontal directions analagous to pickup tubes. With respect to electrical registration of a plurality of imagers the fine alignment of the individual imagers is effected electrically. This electrical alignment may be performed to within a fraction of a pixel thus relaxing manufacturing requirements for precise mechanical alignment. For example, the total mechanical movement needed to register one imager with respect to another may be only two micrometers out of ten rather than two micrometers out of several hundred if exclusive mechanical alignment is used.

In FIG. 1 a television camera includes a zoom lens 10 with a manual control ring 12 which lens focuses a scene (not shown) onto the surfaces of a blue-responsive solid-state imager 14, a red-responsive imager 16 and two green-responsive imagers 18 and 20 by way of prism 22 including dichroic surfaces and a 50% neutral reflecting surface 24 such as a half silvered surface.

Each solid-state imager may be of the CCD frame transfer type (also known as a field transfer CCD) illustrated in FIG. 1b having an "A" register 90 onto which light is focused and in the surfaces of which photoelectrons are generated. Of course, it should be realized that the present invention is not limited to frame transfer CCD's; other solid state imagers also are included. The photoelectrons are constrained within vertical channels 92 by channel stops 94. Vertical motion of the accumulated representative charge is controlled by polyphase (e.g., three phase) clock voltages applied to control electrodes illustrated as 96. After an integrating period, the clock signals are activated to produce transfer of the electrons into the corresponding portions of a "B" register 98 which is free from light influence. The accumulated charge which resides under the control electrodes 96 is clocked in parallel from "B" register 98 to "C" register 99, from which they are clocked in serial fashion by polyphase clock signals applied to clock electrodes 97. The signals are clocked to the right in response to the phase relation of the polyphase clock signals applied to electrodes 97 and are converted from charge signals to voltage signals by an output stage 95, as well known.

Referring to FIG. 1a the output signals from imagers 14, 16, 18 and 20 are applied to preamplifiers 26, 28, 30 and 32, respectively, under the control of clock signals applied from a clock signal generator 34. The signal from clock generator 34 is applied simultaneously to sync signal generator 36 for generating the various sync signals and to the imagers. The clock signals applied to green imager 20 are phase shifted by 180° with respect to those applied to green imager 18 by delay 38 so that the green imagers are clocked to produce an effective improvement in resolution when the imagers are respectively physically displaced by one-half pixel.

The blue and red signals amplified by preamplifiers 26 and 28 are applied to signal processors 40 and 42, respectively, of standard types which may include clamps, shading and gamma corrections and other types of signal processing. The alternately-occurring green signals amplified by amplifiers 30 and 32 are applied to a multiplex circuit 44 which because of the alternate clocking of imagers 18 and 20 alternately receives the output signals from the green imagers. The multiplexed green signals are applied to a standard green signal processing circuit illustrated as block 46. As is often the case, processor 46 is coupled to a green contour generator 48 for generating an edge signal which is added back to the green. The processed signals are applied to an encoder 50 in which the RBG signals are matrixed to YIQ, and the color representative components are quadrature-modulated onto a subcarrier to form a composite signal, such as NTSC or PAL, which is applied to a monitor 52 for reproducing a color image.

One problem to which the invention is directed is that of color misregistration resulting from the mechanical misregistration of the individual imagers. As may be evident, the complexity of the mechanical alignment is dependent on the number of imagers and the tolerances to which the alignment must be performed. As noted above, the regitration of the information from each imager must be within a spatial tolerance of a few micrometers. In the prior art, for example, the imagers had to be mechanically aligned to within two micrometers out of several hundred. In accordance with this invention the individual imagers after coarse mechanical registration of image onto "A" register may be electrically registered to within a few micrometers (a fraction of a pixel) and the final mechanical registration to within, for example, two micrometers out of ten, thus reducing the mechanical movement needed to perform precise registration.

FIG. 2 shows a CCD imager 201 having an "A" register 203, a "B" register 205 and a "C" register 207. "A" register 203 is provided with extra vertical and horizontal elements in its imaging area. Illustratively, the number of extra elements may be about 30 in both the horizontal and vertical directions. Within the physical "A" register a virtual imager 209 is indicated by broken lines. The virtual imager contains the number of pixels corresponding to those actually used in a television display. For example, the virtual imager may contain 403 horizontal and 244 vertical elements. In the system as proposed herein the virtual imager must fall within the limits of the actual physical "A" register from which it can electrically adjust horizontally and vertically. It should be noted that the initial vertical and horizontal mechanical alignment in the case of a multiple-imager color camera requires that the red, blue and green imagers be coarsely aligned within tolerances determined by the dimensions of the difference between the virtual imager and the physical imager.

Figures 3A, 3B, 3C:
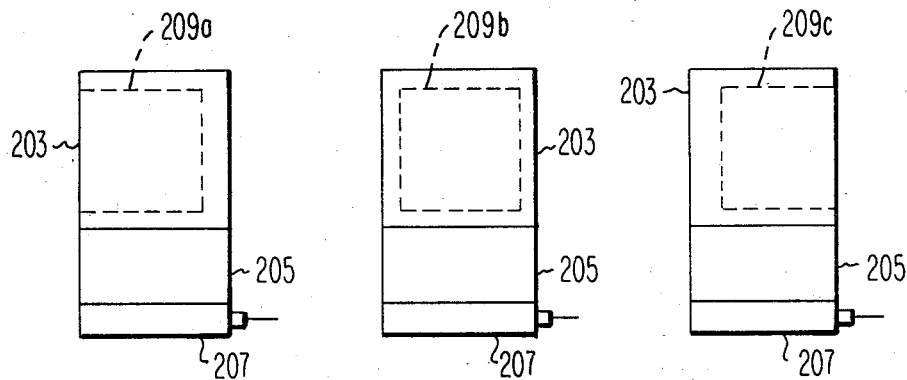
FIGS. 3a–3c illustrate raster patterns aiding in understanding how the virtual imager may be positioned horizontally within the physical imager.

Horizontal alignment can be accomplished by delayed or advanced clocking of the "C" register relative to the active line display (phase adjustment). The clock frequency is chosen so that pixels of the virtual imager are read out in the allotted time for a video line. For example, in the 403×244 (vertical imager size) imager a clock frequency of 7.53 MHz is used to read an active horizontal line in the active horizontal line time, e.g., 53.5 microseconds. FIG. 3 illustrated three different horizontal positions of the virtual imager which may occur. It is assumed for the FIG. 3 analysis that the virtual imager is aligned vertically. Referring to FIG. 3a the virtual imager 209a as shown by broken lines is displaced to the left with respect to "A" register 203. It should be noted that reference numerals of like numbers refer to the same or similar items in the various FIGURES. Referring to FIG. 3b the virtual imager 209b is centered with respect to the "A" register 203 and referring to FIG. 3c the virtual imager 209c is displaced to the right with respect to the "A" register 203.

The delayed clocking of the "C" register generally must be performed within certain constraints. For NTSC the horizontal blanking period is approximately 10 microseconds. This period must be divided into an interval for reading the extra elements of the physical device as well as for the parallel transfer of photoelectrons from the "B" register to the "C" register. The time required for the "B" to "C" transfer is dependent on the vertical transfer gate RC time constant. Illustratively, present devices require approximately 6 microseconds for a worst case transfer. In this illustrative device four microseconds are left for the transfer of the extra pixels. As will be discussed below th extra scan may be performed at the start or end of the horizontal blanking interval depending upon the mechanical registration of the imagers. In the 403×244 imager four microseconds corresponds to 30 extra pixels which provides a range of ±15 pixels adjustment or a total of 480 micrometers.

If the virtual imager is aligned as shown in FIG. 3a the extra pixels on the right edge of the display will be clocked out during the horizontal blanking period which preceeds the transfer of an active horizontal line. If the virtual imager is aligned as shown in FIG. 3b the extra pixels on the right edge of the display will be clocked out during the horizontal blanking period which preceeds the transfer of an active horizontal line while the extra pixels on the left edge are clocked out during the horizontal blanking period which follows the transfer of an active horizontal line. If, on the other hand, the virtual imager is aligned as shown in FIG. 3c the extra pixels on the left edge of the display will be clocked out during the horizontal blanking period which follows the transfer of an active horizontal line. It should be noted that other cases of alignment fall in between those described above. This method effectively moves the virtual imager in discrete pixel steps if the plurality of imagers are clocked from a master clock. Thus, the horizontal error may be resolved to less than one-half of a pixel. It is possible to further reduce this error by adding a variable analog delay in the video output of each device thus allowing alignment to a small fraction of a pixel in the time domain for a given point in a scene. It is also possible to add a controllable delay to the C clock signals applied to the "C" register as an alternative to delaying the video signal.

The above electrical horizontal alignment can give virtually perfect horizontal registration (or, for the case of two offset green-responsive imagers, about perfect ½-pixel offset) as far as time domain alignment of the signals for the case of oversampling. However, if the scene contains components above the Nyquist sampling limit there will be aliased components visible in the displayed image. The appearance of these components is dependent on the center of the sampling aperture with respect to the image projected onto the device. Therefore, depending on the actual location of the pixel centers the appearance of the alias component in the displayed image will depend on the location of the sampling pixels for the particular imagers used. This means that the appearance of the aliasing in the displayed image may be different from camera to camera. To solve this problem the one-half pixel of mechanical movement may be used to assure spatial coincidence of the pixel boundaries in each color channel. It is not important that particular pixels are in alignment but only that their centers coincide. Thus, as described above the mechanical movement needed for registration of an electrically registered device is about 0.6% (2 out of 300) of the mechanical movement needed for registration of a device that uses mechanical registration exclusively.

The operation of the "C" register clocking to effect horizontal registration will now be described with reference to FIG. 4. Monostable multivibrator (MVB) 401 has its TRIGGER input terminal T coupled to receive and trigger on television blanking signals. For example, in the horizontal registration case monostable 401 is responsive to the horizontal blanking pulse. Its Q output is coupled to the TRIGGER input terminal T of monostable 403 whose $\overline{Q}$ output is coupled to one input of NAND gate 405 and to the CLEAR input terminal CLR of counter 411. The output of NAND gate 405 is coupled via inverter 406 to the ENABLE input of start/stop oscillator 407. Oscillator 407 is responsive to high and low inputs applied to its ENABLE input for providing clocking signals. Illustratively, for the horizontal registration of a device into 403 horizontal stages, oscillator 407 provides a clock signal at three times the the pixel rate of 7.53 MHz. The output from start/stop oscillator 407 is applied to timing generator 409. Timing generator 409, in accordance with known techniques, provides a polyphase (e.g., 3 phase) output signal which may be used as the clocking signal for the various registers of the CCD device. With respect to this discussion the three phase output from timing generator 409 is applied to the "C" register to effect serial transfer of signal information to the output thereof. One of the polyphase outputs of timing generator 409 (phase 3) is coupled to the CLOCK input CLK of counter 411. The output from counter 411 is applied to decoder 413 which is pictorially shown as a NAND gate. The output from decoder 413 is applied to the other input of NAND gate 405.

Figure 5:
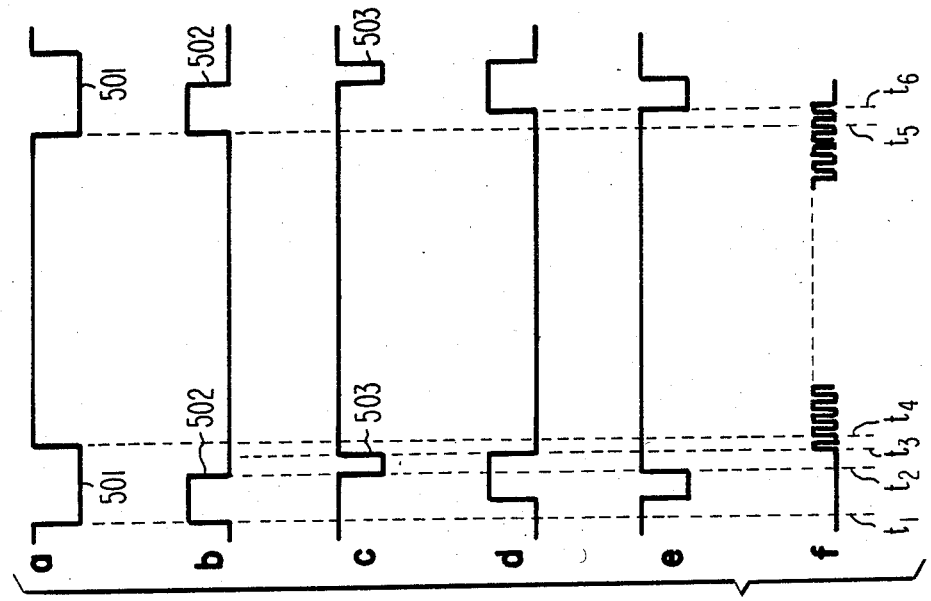
FIG. 5 shows timing waveforms a–f which aid in the understanding of the FIG. 4 circuit.

The operation of the FIG. 4 circuit will be explained with reference to FIG. 5. Monostable 401 is arranged as a delay while monostable 403 is arranged to provide a pulse to reset counter 411 and inhibit the start/stop oscillator during the clear interval. When a horizontal blanking pulse 501 (waveform a of FIG. 5) is applied to the TRIGGER input of monostable 401 (at time t, of its Q waveform a of FIG. 5) output will go high and remain high for a predetermined time (pulse 502 of waveform b of FIG. 5). When the Q output of monostable 401 goes low (time $t_2$ of waveform b of FIG. 5), monostable 403 is triggered. Monostable 403 provides a relatively short duration pulse 503 (waveform c of FIG. 5). Pulse 503 clears counter 411 and causes NAND gate 405 to go from a high logical state to a low state after removal of pulse 503. Waveform d of FIG. 5 shows the output from NAND gate 405. When NAND gate 405 goes low a logical high pulse (via inverter 406) is delivered to start/stop oscillator 407 which commences to provides clocking pulses to timing generator 409 (waveform f of FIG. 5) in response to the logical high. Timing generator 409 provides polyphase clocking pulses to the "C" register starting at time $t_3$. Counter 411 counts the timing generator pulses of one phase (e.g., phase 3) until a predetermined count (e.g., 403 to 433 depending upon the position of the virtual imager) is reached. When the predetermined count is reached decoder 413 goes from a high logical state to a low logical state causing NAND gate 405 to go high. When NAND gate 405 goes high start/stop oscillator 407 receives a low logical state (via inverter 406) causing it to stop providing clocking pulses. When the $\overline{Q}$ output of monostable 403 goes low again counter 411 clears causing decoder 413 to change state thus setting the counter and decoder for the next cycle. Waveform e of FIG. 5 shows details of the output of decoder 413. In summary, timing generator 409 responsive to the output of oscillator 407 provides clocking pulses to the "C" register starting at time $t_3$. At the trailing edge of the horizontal blanking interval (time $t_4$) pixel information representative of the image in the active region if the video (i.e., the virtual imager) is clocked out of the "C" register. Thus, the time period $t_3$ to $t_4$ represents extra pixels on the righthand side of the physical "A" register. The pixels representative of the active video (virtual imager) in a horizontal line are clocked out of the "C" register during the time period $t_4$ to $t_5$. Timing generator 409 continues to provide clocking pulses for the time period $t_5$ to $t_6$ to clock the extra pixels which are present on the lefthand side of the device. At time $t_6$ counter 411 reaches its predetermined count and thus causes start/stop oscillator 409 to stop (via decoder 413, NAND gate 405 and inverter 406). Thus it can be seen that monostable 401 may be adjusted (by varying its pulse length output to vary the timing of the starting and stopping of oscillator 407) to effectively control the horizontal position of the virtual imager on the photosensitive register. The virtual imager may be moved to the right or left on a display to adjust the horizontal registration of the device.

The virtual imager can be moved vertically within the physical imager by controlling the A-to-B transfer pulses. In this way registration can be accomplished in discrete pixel steps. Assuming that the virtual imager is 403×244 pixels and 30 extra pixels are provided in the physical "A" register, it would have 274 vertical elements. To eliminate the possibility of charge remaining in the "A" register after the vertical transfers, the "B" register should also have 274 storage locations vertically. FIG. 6 illustrates the effect of varying the A-to-B transfer pulse sequence. For this case it is assumed that the virtual image is centered horizontally. For the case of FIG. 6a where the virtual imager 209a is positioned in the bottom portion of "A" registor 203 the bottom most line of "A" register 203 becomes the first line above "C" register 207 and is the first read out during the active field. After the B-to-C transfers are completed the extra 30 lines remain in "B" register 205. These are transferred to "C" register 207 during the next A to B transfer cycle and are serially removed by the output register. For the case of FIG. 6b where virtual imager 209b is positioned at the top of "A" register 203, the 31st line above the A-to-B interface becomes the first line read out in the active field. The extra 30 lines are transferred into "C" register 207 by the A-to-B transfers and are removed by the "C" register. In the case of FIG. 6c a centered condition is present. In this case the 16th line above the A to B interface is the first line readout in the active field. The bottom 15 extra lines are read out in the same way as the excess 30 lines in the FIG. 6b case. The top 15 extra lines remain in "B" register 205 and are transferred to "C" register 207 and ultimately removed from the device during the next A to B transfer interval. As was the case with horizontal registration the electrical vertical registration can be performed to within one-half of a vertical pixel dimension and this error can be mechanically reduced.

The operation of the vertical registration will be explained by reference to FIG. 4. It should be noted that the circuit diagram of FIG. 4 may be used for either the horizontal or vertical registration with some minor changes. One change is that the blanking pulse which is delivered to the clear input of monostable 410 is the vertical blanking pulse in the vertical registration case rather than the horizontal blanking pulse. Start/stop oscillator 407 would provide signals representative of the clocking of signal information from the "A" register to the "B" register. Decoder 413 would be provided with a different predetermined number (i.e., for the 403×244 imager the predetermined number would range from 274 to 304 depending upon the position of the virtual imager). The other difference is that the transition from the "A" to the "B" register must be performed during the vertical blanking time.

Figure 4:
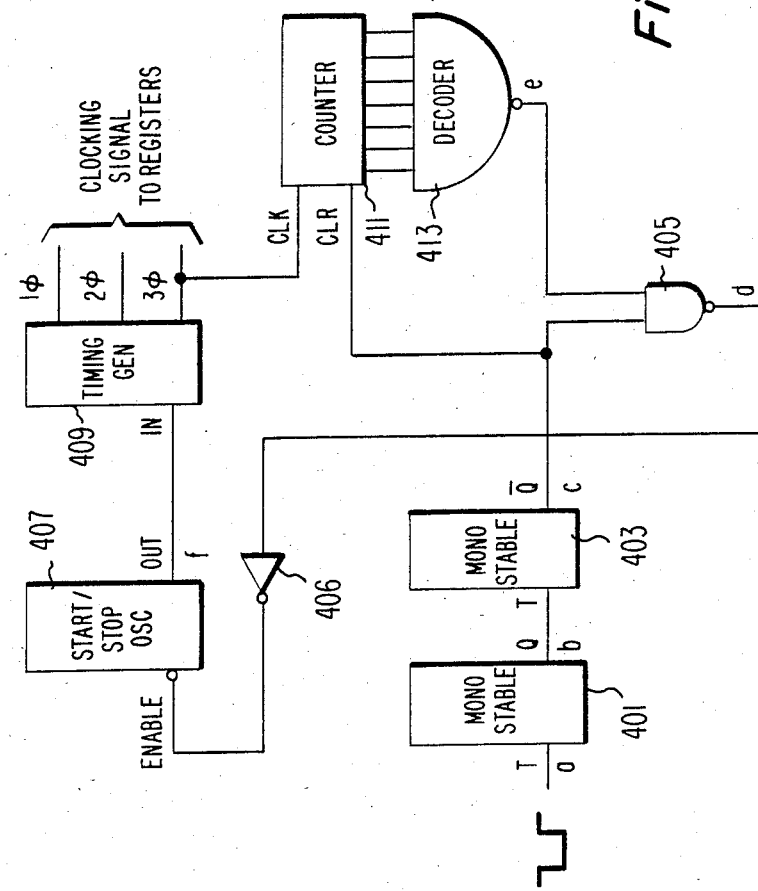
FIG. 4 illustrates, partially in block diagram form, a circuit for carrying out the clocking of an imager to effect the electrcal registration in accordance with the principles of the present invention.

Referring to FIG. 7 the timing of the FIG. 4 embodiment for effecting the vertical registration is provided. FIG. 7 shows a video signal having a vertical blanking pulse 601 and an active field interval 603. Monostable 401 is triggered at time $t_0$ by the leading edge of blanking pulse 601. After a slight delay dependent upon the pulse width of monostable 401 start/stop oscillator 407 is enabled at time $t_1$ to initiate transfers via the clocking signals from timing generator 409 from the "A" to the "B" register. It should be noted that the time delay provided by monostable 401 for the vertical registration case is not important since its only purpose is to provide a clear signal to counter 411. The transfer from the "A" to the "B" register is such that the bottom-most line of the virtual imager corresponds with the bottom most line of the "B" register. Thus when the B to C transfers begin at time $t_2$ which is at the start of the active video the initial transfer to the "C" register at time $t_2$ is representative of the first line of information in the virtual imager. Those extra lines which are still present in the "B" register after the signal representative of the virtual imager has been transferred are clocked from the "B" to the "C" register during the next A to B transfer. During this time the "C" register may be clocked to prevent any charge buildup therein.

The electrical registration may be further improved by redefining the positions (collection centers) within vertical channels 92 of FIG. 1b which accumulate the light generated charge. This can move the collection centers in ⅓ pixel steps for a three phase device. For the vertical registration case, after the integration interval the collected charge must be manipulated to the corrected position for the A to B transfers. This technique will register the devices within ⅓ of the pixel element.

This adjustment technique will be explained with reference to FIG. 8. FIG. 8 shows a portion of a three phase CCD "A" register 801 having gates 803, 805, 807, 809, 811, 813. Gates including 803, 809; 805, 811; 807, 813 are coupled to a respective clock phase of clock signals $\phi_1$, $\phi_2$, $\phi_3$. In a 2:1 interlace television system, one phase, e.g., $\phi_1$, is held high during odd fields while the other two phases, e.g., $\phi_2$ and $\phi_3$, are held high during the even fields. Thus during an integration period the charge collection positions are defined by the particular phase or phases which is held high. By using combinations of the available phases the position of the collection sites for the odd and even fields may be shifted up and down on the imager in ⅓ pixel steps thus effectively varying the registration in ⅓ pixel steps. For example, if phase 2, $\phi_2$, is held high during the odd fields and phases 1 and 3, $\phi_1$ and $\phi_3$ are held high during the even fields the collection sites would be shifted by ⅓ of a pixel from the example given above where $\phi_1$ is held high during odd fields and $\phi_2$ and $\phi_3$ are held high during the even fields.

While the embodiments described include specific examples with respect to CCD imagers, these examples are not meant to be limiting. For example, the electrical registration could be effected on other solid state devices such as an interline transfer device (ITD). In an ITD the horizontal registration could be accomplished in accordance with the techniques described herein. For the vertical registration the signal charge could be clocked along the vertical channels during the vertical blanking interval to align the bottom of the virtual imager with the horizontal transfer gate and the extra pixels at the top of the imager (if there are any) could be clocked out after the transfer of the pixels in the active video.

What is claimed is:

1. In a television camera having a solid-state imager including a photosensitive surface having photosensors arranged in a plurality of lines for developing lines of signals representative of information in a scene imaged thereon and a storage area into which said plurality of lines of signals are transferred and from which is provided a television signal having active field portions representative of said scene, an apparatus comprising:

lens means for imaging said scene onto said photosensitive surface of said imager;

clock means for providing a plurality of clocking transfer signals to said photosensitive surface and said storage area for transferring said lines of signals representative of information in said scene from said photosensitive surface into and then from said storage area; and clock control means, responsive to said clock means, for adjustably controlling the number of said clocking transfer signals provided to said photosensitive surface and said storage area so as to control the vertical position of the lines of signals produced from a predetermined portion of said photosensitive surface having an area less than the total area of said photosensitive surface into said storage area such that when said lines of signals are transferred from said storage area they correspond in time with said active field portions of said television signal, thereby producing a television signal representative of the scene imaged onto said predetermined portion.

2. The apparatus according to claim 1 wherein said imager is a charge-coupled device.

3. The apparatus according to claim 2 wherein said charge-coupled device is a frame-transfer type charge-coupled device.

4. In a color camera for providing signals represenative of a scene, said camera including:

first and second imagers for providing first and second information signals, respectively, representative of information in said scene, said first and second imagers having first and second photosensitive regions, respectively, each including a plurality of collection sites for developing said information signals during recurrent integration periods, the photosensitive regions of each of said first and second imagers having transfer gates which define the location of each of said collection sites;

imaging means, interposed between said scene and said first and second imagers, for projecting images of first and second color components of said scene onto said first and second photosensitive regions, respectively, the image of said first color component on said first photosensitive region being spatially misregistered with respect to the image of said second color component on said second photosensitive region.

clock means, coupled to said imagers, for providing polyphase signals to said transfer gates for developing said information signals during said integration periods and thereafter clocking said information signals through said photosensitive regions of said imagers; and registration control means coupled to said clock means for causing, during said integration periods, different polyphase signals to be applied to the transfer gates of said first imager as compared with the polyphase signals applied to the transfer gates of said second imager in a manner so as to spatially shift the collection sites in said first photosensitive region so that said spatial misregistration between said first and second images of said color components on said photosensitive regions is reduced.

5. The camera according to claim 4 wherein said registration control means couples different phases of said polyphase clock signal to corresponding transfer gates of said first and second imagers.

6. The camera according to claim 4 wherein said imagers are charge-coupled devices.

7. The camera according to claim 6 wherein said imagers are frame-transfer type charge-coupled devices.

* * * * *